(12) United States Patent
Tate et al.

(10) Patent No.: US 11,499,470 B2
(45) Date of Patent: Nov. 15, 2022

(54) VEHICLE WITH PARALLEL ENGINE COOLING SYSTEMS

(71) Applicant: EXMARK MANUFACTURING COMPANY, INCORPORATED, Beatrice, NE (US)

(72) Inventors: Jeremy J. Tate, Beatrice, NE (US); Derek L. Dragoo, Clatonia, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 205 days.

(21) Appl. No.: 16/862,045

(22) Filed: Apr. 29, 2020

(65) Prior Publication Data
US 2021/0340898 A1    Nov. 4, 2021

(51) Int. Cl.
| F01P 11/10 | (2006.01) |
| F01P 5/02 | (2006.01) |
| A01D 34/00 | (2006.01) |
| A01D 101/00 | (2006.01) |

(52) U.S. Cl.
CPC .............. *F01P 11/10* (2013.01); *A01D 34/00* (2013.01); *F01P 5/02* (2013.01); *A01D 2101/00* (2013.01); *F01P 2060/04* (2013.01)

(58) Field of Classification Search
CPC ..................... F01P 5/02; F01P 11/10
See application file for complete search history.

(56) References Cited

U.S. PATENT DOCUMENTS

| 3,696,796 | A | | 10/1972 | Gavrun |
| 3,978,938 | A | * | 9/1976 | Joscher .................. B60K 11/04 |
| | | | | 180/68.4 |
| 4,573,544 | A | | 3/1986 | Hoch et al. |
| 5,816,350 | A | * | 10/1998 | Akira .................... E02F 9/0891 |
| | | | | 180/68.1 |
| 5,947,219 | A | | 9/1999 | Peter et al. |
| 6,105,349 | A | | 8/2000 | Busboom et al. |
| 6,449,933 | B1 | | 9/2002 | Umemoto et al. |
| 6,823,955 | B2 | | 11/2004 | Hall et al. |
| 7,370,718 | B2 | | 5/2008 | Witwer et al. |
| 7,559,295 | B2 | | 7/2009 | Yamada et al. |
| 7,814,963 | B2 | * | 10/2010 | Adamson ............ F02B 29/0431 |
| | | | | 165/41 |
| 9,497,956 | B2 | | 11/2016 | Dubose et al. |

FOREIGN PATENT DOCUMENTS

| CA | 2173528 | 12/1997 |
| JP | 2002-101726 | 4/2002 |
| JP | 4773314 | 9/2011 |

* cited by examiner

*Primary Examiner* — Kevin A Lathers
(74) *Attorney, Agent, or Firm* — Mueting Raasch Group

(57) ABSTRACT

The technology disclosed herein relates to a grounds maintenance vehicle. The grounds maintenance vehicle has an engine and an engine shroud defining a cooling volume around the engine. The shroud defines a shroud intake. An engine oil conduit extends from the engine and a heat exchanger is coupled to the engine oil conduit.

21 Claims, 8 Drawing Sheets

VEHICLE WITH PARALLEL ENGINE COOLING SYSTEMS

TECHNOLOGICAL FIELD

Embodiments of the present disclosure are generally related to vehicles. More particularly, embodiments of the present disclosure are related to vehicles with parallel cooling systems.

BACKGROUND

Grounds maintenance vehicles such as lawn mowers, aerators, and spreader/sprayers are commonly used by homeowners and professionals alike. These vehicles are typically configured as walk-behind or ride-on vehicles having an attached implement (such as a grass cutting deck) to perform the maintenance work, where the implement is secured to a frame of the grounds maintenance vehicle. While different power sources are known, grounds maintenance vehicles utilizing an internal combustion (IC) engine to power the implement as well as a vehicle propulsion system are well known. IC engines are known to produce heat during operation and, as a result, various types of cooling systems can be employed to cool the engine. For example, grounds maintenance vehicles can simply utilize an air cooled engine where surrounding ambient air extracts heat from the engine.

In some examples, grounds maintenance vehicles may incorporate a liquid cooled engine, where liquid coolant circulating through the engine extracts heat. The heated coolant is then directed through a liquid-to-air heat exchanger (such as a radiator) where the heated coolant transfers heat to the surrounding ambient air environment. Air can be circulated around or through the heat exchanger to assist with heat transfer to the ambient air environment, such as through the use of a fan.

Debris is generally ubiquitous in the environments within which the grounds maintenance vehicles are used. Grass clippings, dirt, leaves, and the like, may be transported by airflow around the vehicle. As such, regardless of the specific type of cooling system employed, screens may be disposed around vehicle system components to obstruct such debris from adversely affecting vehicle systems.

SUMMARY

The technology disclosed herein relates to a vehicle having multiple engine cooling systems that operate in parallel. Some embodiments relate to a grounds maintenance vehicle. An engine enclosure defines an air intake area. A screen extends across the air intake area. The engine enclosure has at least one inner enclosure surface defining at least one airspace volume between the air intake area and the inner enclosure surface. An engine is disposed in the engine enclosure. An engine shroud defines an engine cooling volume about a portion of the engine. A heat exchanger is disposed in the engine enclosure. The heat exchanger is configured to receive engine oil. The vehicle defines a first airflow pathway extending from the air intake area to the engine shroud, and a second airflow pathway extending from the air intake area through the heat exchanger. The first airflow pathway and the second airflow pathway are arranged in parallel.

In some such embodiments, the grounds maintenance vehicle has a first fan disposed across the first airflow pathway. Additionally or alternatively, the grounds maintenance vehicle can have a second fan disposed across the second airflow pathway. Additionally or alternatively, the at least one airspace volume is a single airspace volume. Additionally or alternatively, the at least one airspace volume has a first airspace volume and a second airspace volume discrete from the first airspace volume. In such an embodiments the first airflow pathway extends through the first airspace volume and the second airflow pathway extends through the second airspace volume.

Additionally or alternatively, the engine shroud defines a shroud intake that extends to an airspace volume of the at least one airspace volume. Additionally or alternatively, a combustion intake extends from the engine shroud to an air cleaner. Additionally or alternatively, the inner enclosure surface forms a seal around each of the heat exchanger and the engine shroud. Additionally or alternatively, the screen defines an upper surface, a back surface and a front surface of the engine enclosure. Additionally or alternatively, the engine enclosure defines an engine cavity isolated from the at least one airspace volume, and the engine is disposed in the engine cavity.

Some embodiments of the technology disclosed herein relate to a grounds maintenance vehicle having an engine and an engine shroud defining a cooling volume around the engine. The engine shroud defines a shroud intake. An engine oil conduit extends from the engine. A heat exchanger is coupled to the engine oil conduit.

In some such embodiments the grounds maintenance vehicle has an engine enclosure containing the engine. The engine enclosure defines an air intake area, where at least one screen extends across the air intake area. The air intake area is upstream of the shroud intake and the heat exchanger. Additionally or alternatively, the screen defines an upper surface, a back surface and a front surface of the engine enclosure. Additionally or alternatively, the engine enclosure has at least one inner enclosure surface, where an airspace volume is defined between the screen and each inner enclosure surface, and where an airspace volume is upstream of each of the shroud intake and the heat exchanger.

Additionally or alternatively, the shroud intake extends to the airspace volume. Additionally or alternatively, the inner enclosure surface defines a first inner surface opening and the shroud intake extends across the opening. Additionally or alternatively, the inner enclosure surface defines a second inner surface opening and the heat exchanger extends across the opening. Additionally or alternatively, the vehicle has a combustion intake extending from the engine shroud to an air cleaner. Additionally or alternatively, the vehicle has a first fan configured to direct airflow into the engine shroud. Additionally or alternatively, the vehicle has a second fan configured to direct airflow into the heat exchanger.

In some embodiments, the present technology relates to grounds maintenance vehicle having a vehicle frame and drive wheels coupled to the vehicle frame. An implement is coupled to the vehicle frame and an engine enclosure is coupled to the vehicle frame. The engine enclosure defines an engine cavity and an airspace volume isolated from the engine cavity within the engine enclosure. The engine enclosure has a screened area between the airspace volume and an ambient environment. An engine is disposed in the engine cavity of the engine enclosure. A first engine cooling system has an engine shroud defining an engine cooling volume about a portion of the engine. The first engine cooling system defines a first airflow pathway extending from the screened area to the engine cavity via the engine cooling volume. A second engine cooling system has a heat exchanger, an oil flow pathway from the engine to the heat exchanger, and a second airflow pathway extending from the screened area to the engine cavity through the heat exchanger. A combustion intake extends from the shroud into the engine. In some such embodiments, the implement has a cutting deck.

The above summary is not intended to describe each embodiment or every implementation. Rather, a more complete understanding of illustrative embodiments will become apparent and appreciated by reference to the following Detailed Description of Exemplary Embodiments and claims in view of the accompanying drawings.

BRIEF DESCRIPTION OF THE DRAWINGS

Exemplary embodiments will be further described with reference to the figures, wherein.

Figure 1:
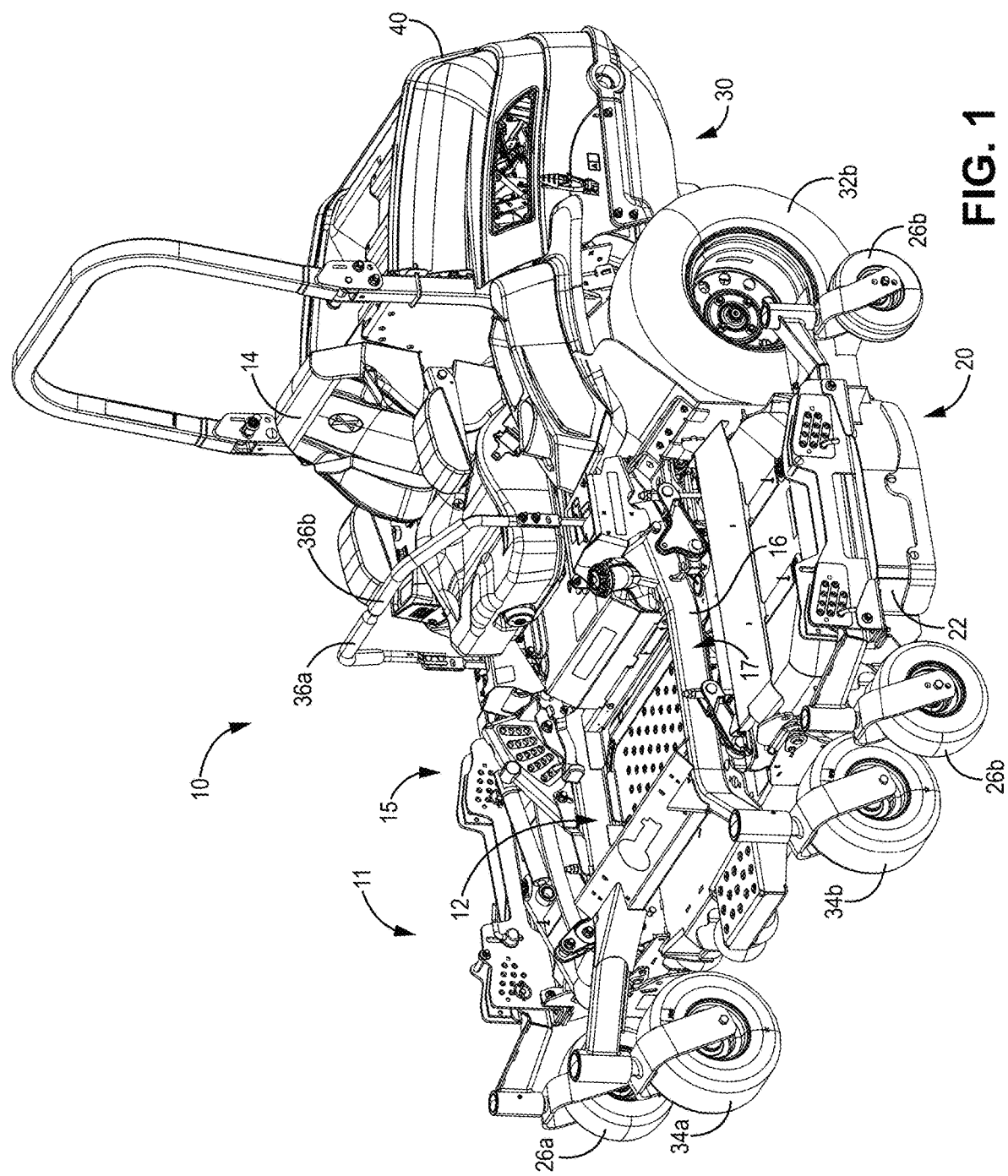
FIG. 1 depicts a perspective view of an example grounds maintenance vehicle, e.g., riding lawn mower, in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or from the perspective of one operating the vehicle while it is in an operating configuration. The numerical descriptors such as "first," "second," and "third" are used herein to distinguish components having similar names and should not be interpreted as limiting the location or function of the particular component referenced. Each term is used only to simplify the description and is not meant to limit the interpretation of any embodiment described.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "adapted," "constructed", "manufactured", and the like.

The suffixes "a" and "b" may be used with element numbers throughout this description to denote various right- and left-side parts/features, respectively. The parts/features denoted with "a" and "b" suffixes can be substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature and may correspond to a reference numeral on a drawing that is accompanied by a letter suffix.

Figure 2:
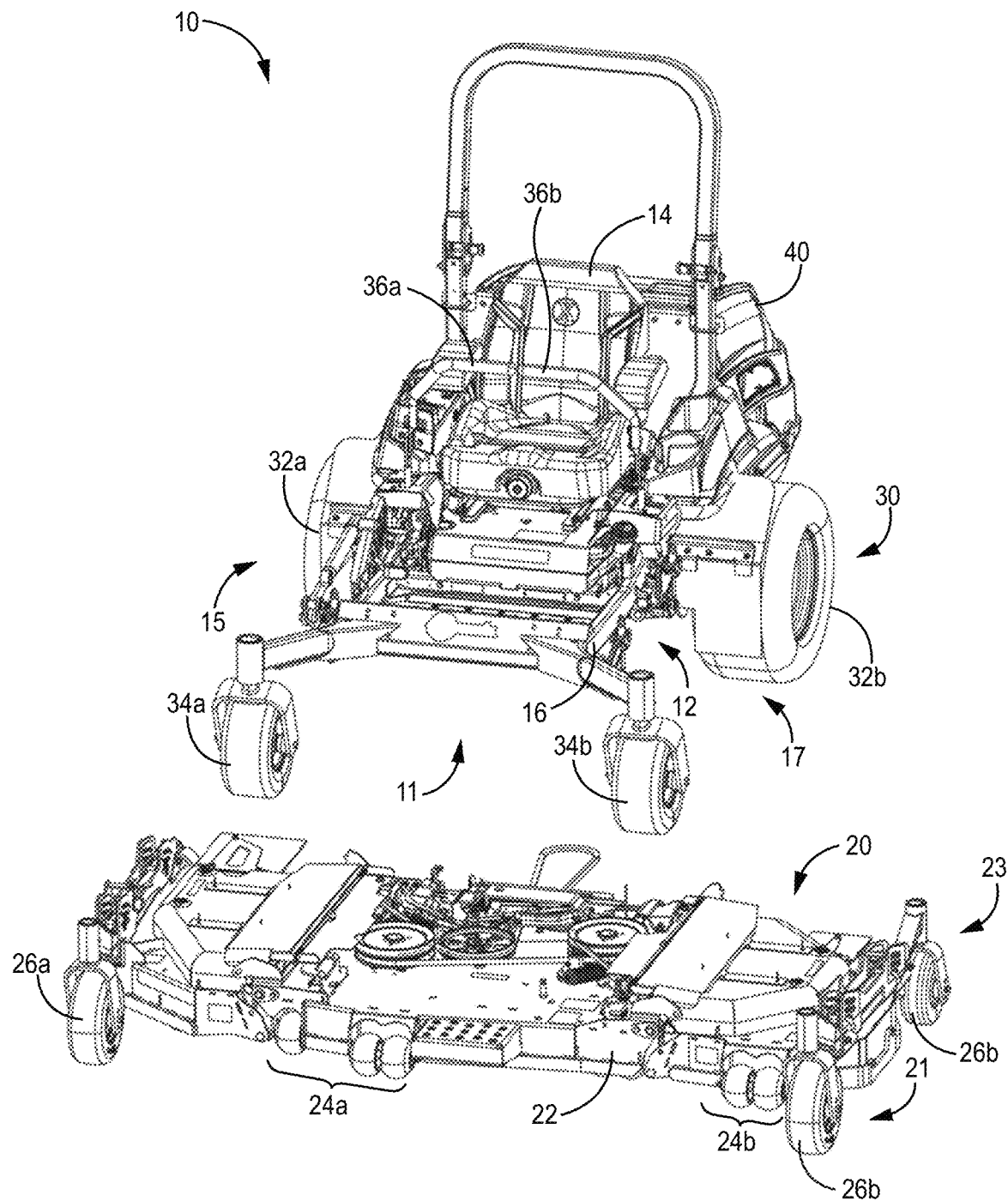
FIG. 2 depicts another view of an example grounds maintenance vehicle consistent with FIG. 1 with an implement, e.g., cutting deck shown exploded therefrom.

With reference to the figures, where like reference numerals designate like parts and assemblies throughout the several views, FIG. 1 illustrates an example grounds maintenance vehicle 10 in accordance with the present disclosure, which can simply be referred to as a "vehicle". FIG. 2 is another view of the vehicle 10 with an implement (e.g., cutting deck 20) shown exploded from the vehicle 10. The vehicle 10, in the current example, is a wide area riding lawn mower. While embodiments are described herein with respect to such a mower, this disclosure is equally applicable to mowers having alternate configurations (e.g., walk-behind mowers and stand-on mowers). Moreover, embodiments of the present disclosure may also find application to other types of grounds maintenance vehicles (e.g., aerators, spreader-sprayers, dethatchers, debris management systems, blowers, vacuums, sweepers, general purpose utility vehicles, etc.) without limitation.

The vehicle 10 has a vehicle frame 16. The vehicle 10 has a first portion that is an implement assembly 20 and a second portion that is a propulsion vehicle 30. Each of the implement assembly 20 and the propulsion vehicle 30 are coupled to the vehicle frame 16. The propulsion vehicle 30 of the grounds maintenance vehicle 10 can have drive wheels 32 (only left drive wheel 32a visible in FIG. 1) and an internal combustion engine (not visible in FIGS. 1 and 2) that are configured to selectively propel the vehicle 10 across a ground surface. The propulsion vehicle 30 is configured to transmit engine power to the drive wheels 32 and to the implement assembly 20. The engine can be contained within an engine enclosure 40 generally coupled to the vehicle frame 16. The engine enclosure 40 (described in more detail herein) can be configured to partially isolate the engine from the ambient environment. The propulsion vehicle 30 can have handles 36 by which the vehicle 10 is directed and controlled by an operator. The propulsion vehicle 30 can also incorporate various other controls configured to be manipulated by the operator to control various functions of the vehicle 10.

The currently-depicted implement assembly 20 is a mower deck assembly 20 that can be consistent with a walk-behind lawn mower, a ride-on lawn mower, or an autonomous mower as examples. The implement assembly 20 is configured to attach the vehicle frame 16 in what is commonly referred to as "mid-mounted" configuration. The implement assembly 20 is configured to perform a maintenance task on a surface, such as a ground or turf surface. In the current example, the implement assembly 20 is a mower deck assembly having a housing 22 defining a downwardly (as viewed in FIG. 1) opening cutting chamber (not visible). Cutting blades (not shown) are rotatably disposed within the cutting chamber. During operation, power is selectively delivered to the cutting blades by the engine, whereby the blades rotate at a speed sufficient to sever grass and other vegetation over which the deck passes. Other types of cutting decks (e.g., out-front decks, towed decks, reel units, etc.), as well as implements other than cutting decks, are contemplated within the scope of this disclosure.

The propulsion vehicle 30 of the grounds-maintenance vehicle can define components consistent with a ride-on lawn mower or a walk-behind lawn mower. In the current example, a seat 14 is coupled to a vehicle frame assembly 12, where the seat is configured to support a seated operator. In some other embodiments, a standing platform is coupled to the vehicle frame, where the standing platform is configured to support a standing operator.

The vehicle frame assembly 12 may include the vehicle frame 16 having a first side 15 and a second side 17. The vehicle frame 16 is coupled to a first ground-engaging member 34a and a second ground-engaging member 34b that are disposed between the vehicle frame assembly 12 and the ground surface. The ground-engaging members 34 are generally configured to accommodate translation of the vehicle frame assembly 12 across the ground surface. In the current example, the ground engaging members 34 are wheels that are rotatably coupled to the vehicle frame assembly 12. More particularly, the ground engaging members 34 are caster wheels that rotate (for rolling) and swivel (for turning) and are coupled to a front end 11 of the vehicle frame assembly 12. In some embodiments, the ground engaging members can be alternate structures or components other than caster wheels such as tracks, rollers, or skids. While the members 34 are shown as passive (undriven wheels), in other embodiments they may be drive wheels.

The implement assembly 20 has a first (e.g., front) implement end 21 and a second (e.g., rear) implement end 23 and is generally configured for operational interaction with the ground surface. In the current example, the implement assembly 20 is configured to be disposed between at least a portion of the vehicle frame assembly 12 and the ground surface (e.g., a mid-mounted deck). In the current example, the implement assembly 20 also has a plurality of ground-engaging members configured to enable translation of the implement assembly 20 across the ground. For example, a plurality of caster wheels 26 may be coupled to the implement assembly 20. The implement assembly 20 can also have a plurality of rollers 24 (e.g., anti-scalp rollers) configured to be disposed between the implement assembly 20 and a ground surface to limit contact between parts of the implement assembly 20 (e.g., the cutting blades) and the ground surface. The plurality of rollers 24 can be configured to reduce scalping of the ground surface as the implement assembly translates across the ground surface.

The implement assembly 20 can be coupled to the vehicle frame assembly 12 through a variety of types of coupling structures such as chains, rods, linkages, cables, slotted plates, and other structures that allow the implement assembly 20 to hang from the vehicle frame assembly 12. Such coupling structures can define an operating height or "height-of-cut" of the implement assembly 20 relative to the ground surface. In various embodiments, the operating height between the implement assembly 20 and the ground surface is selectable by a user.

Figure 3A:
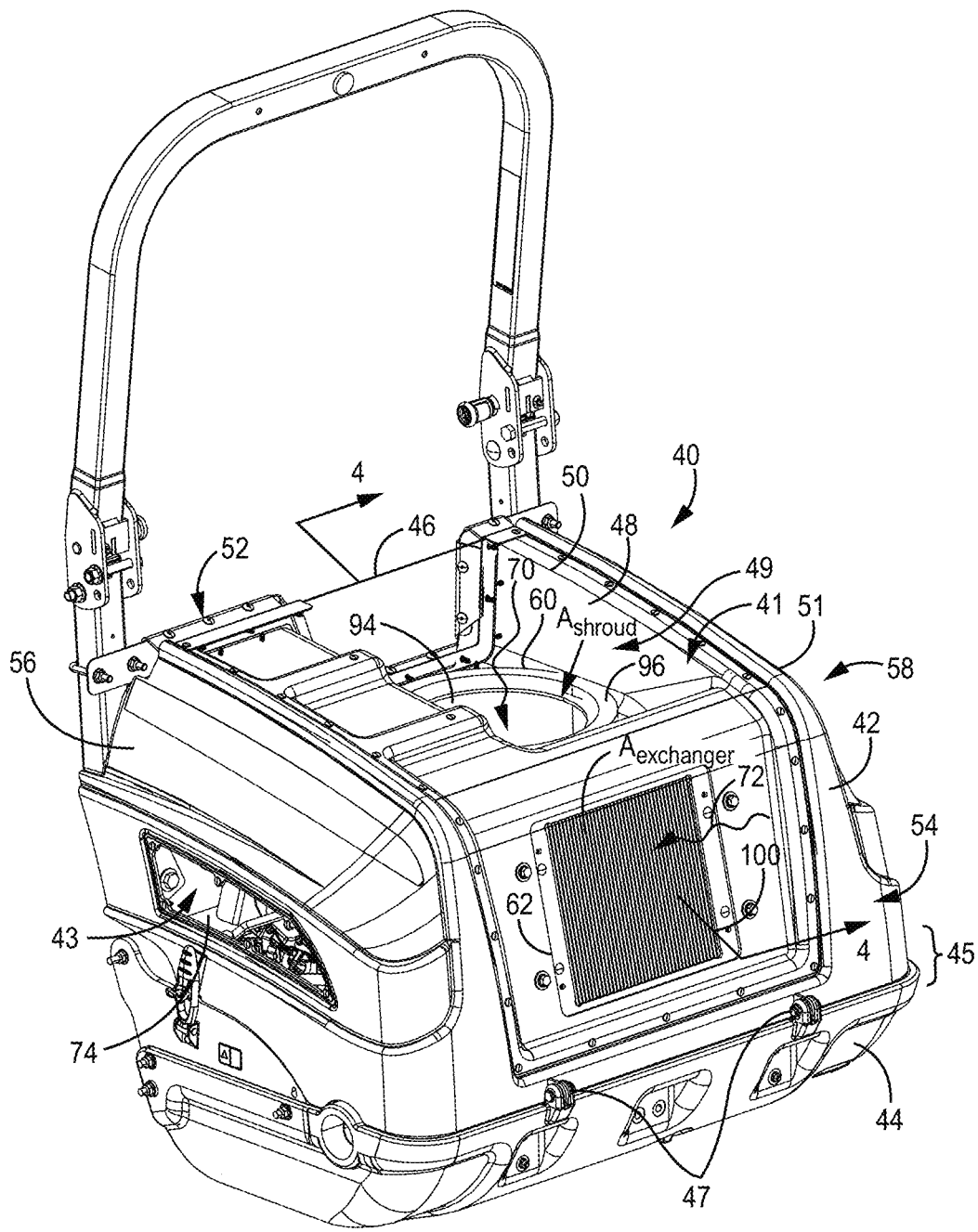
FIG. 3A is a first perspective view of an example engine enclosure consistent with various embodiments.
Figure 3B:
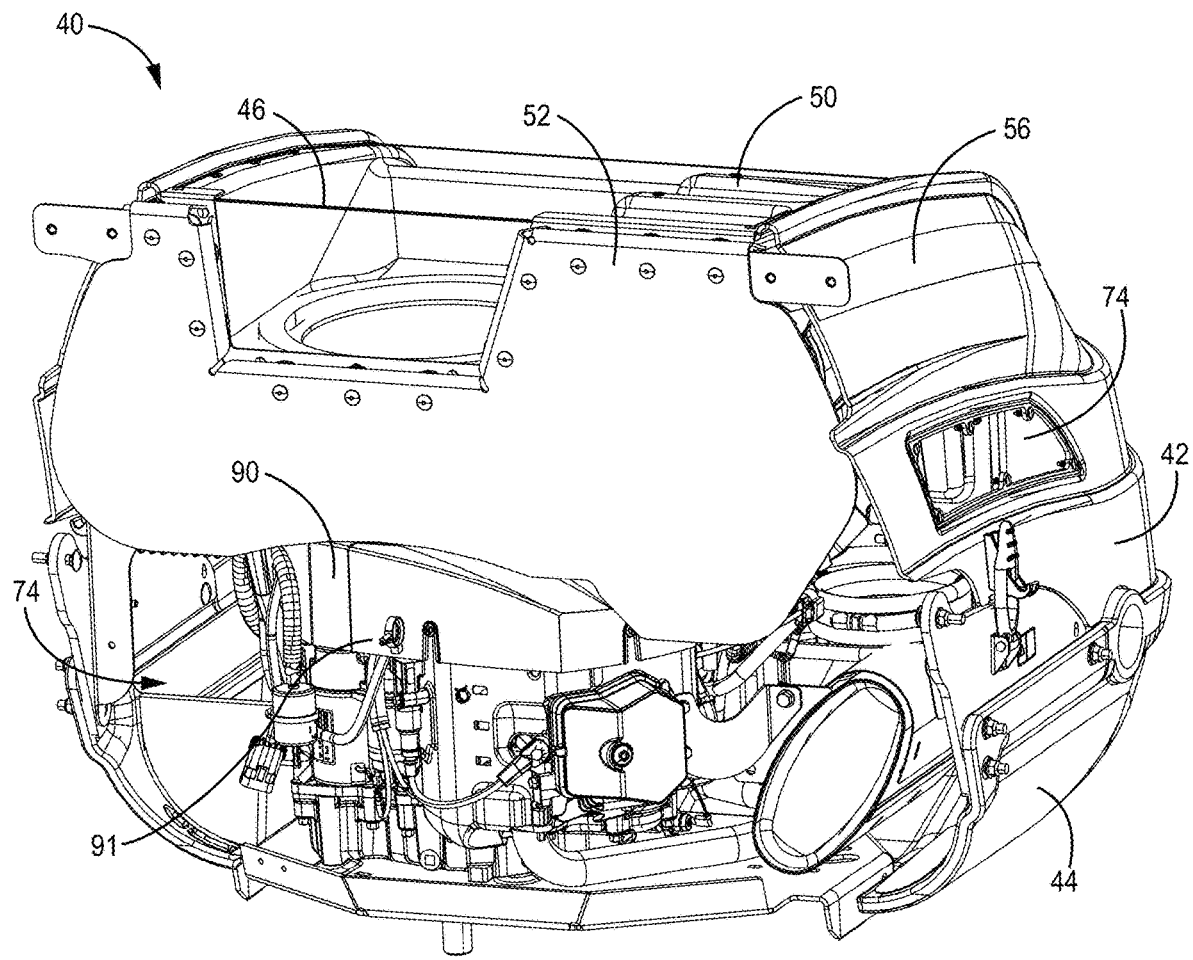
FIG. 3B is a second perspective of the example engine enclosure consistent with various embodiments.
Figure 4:
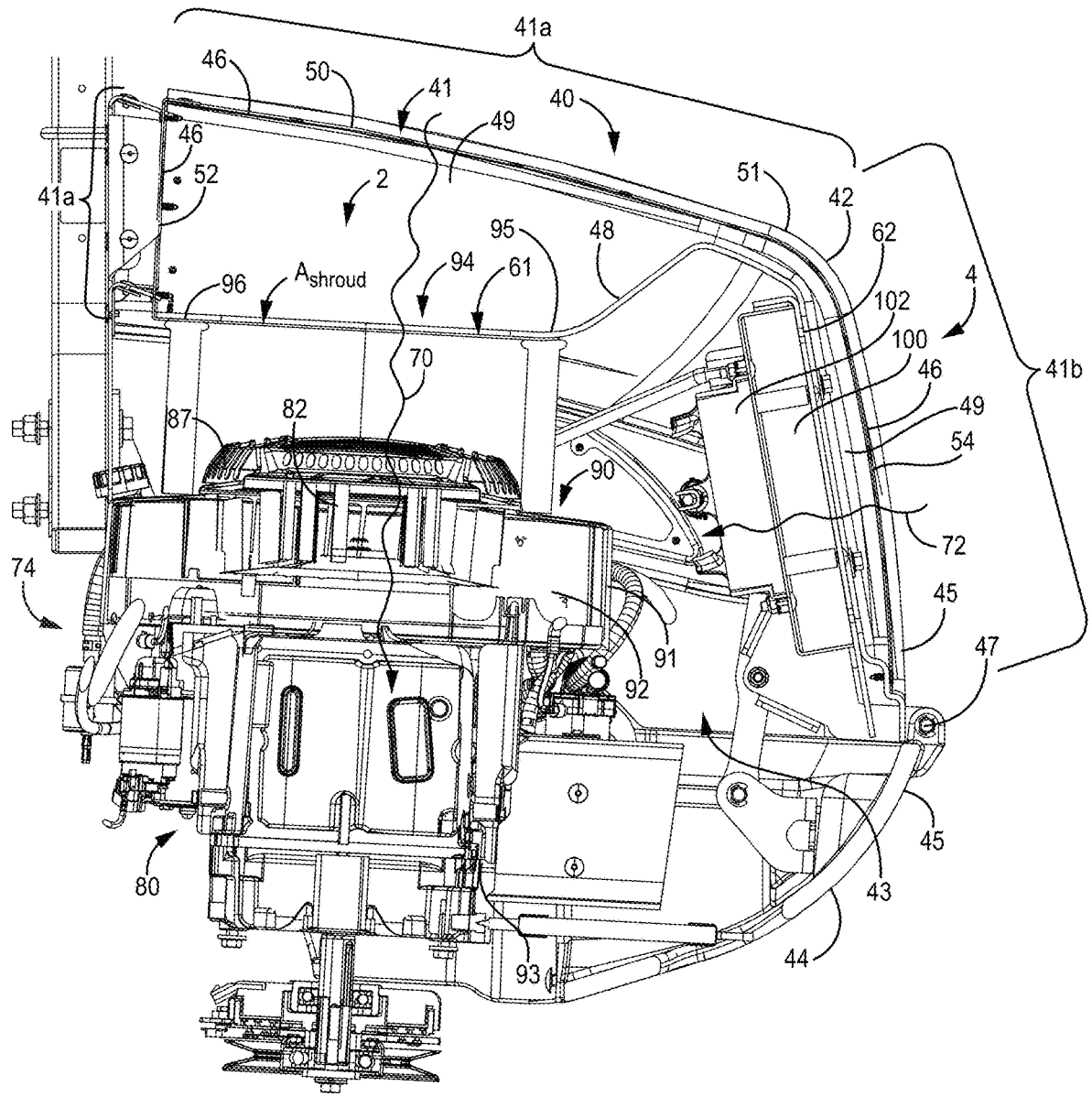
FIG. 4 is cross-sectional view of the example engine enclosure consistent with some embodiments, taken along line 4-4 of FIG. 3A.

FIG. 3A is a first perspective, isolated view of an example engine enclosure 40 consistent with various embodiments, where a screen 46 (see FIG. 4) is shown as transparent in this view for clarity. FIG. 3B is a second perspective, isolated view of the example engine enclosure 40 consistent with various embodiments. FIG. 4 is a cross-sectional view of the example engine enclosure 40 taken along line 4-4 of FIG. 3A. The engine enclosure 40 is coupled to the vehicle frame 16 (see FIG. 1) and is generally configured to partially or completely contain or surround the vehicle engine and its associated engine cooling systems as further described herein. In various embodiments, the engine enclosure 40 is configured to contain an air-cooled engine with a separate engine oil cooler.

The engine enclosure 40 generally defines an air intake area 41 that is configured to permit passage of outside ambient air into the engine enclosure 40. The air intake area 41 is in fluid communication with each of the plurality of air cooling systems.

The engine enclosure 40 has an outer enclosure assembly 45 forming an outer surface of the engine enclosure 40, and an inner enclosure surface 48. The outer enclosure assembly 45 defines an air intake area 41. the outer enclosure assembly 45 has a screen 46 that extends across the air intake area 41. In FIGS. 3A and 3B, the screen 46 is shown to be transparent for visibility of components within the engine enclosure 40. The screen 46 is generally configured to accommodate airflow through the opening 41. The screen 46 is also configured to obstruct air-entrained debris from passing into the engine enclosure 40. The screen 46 can be constructed of a metallic or plastic mesh in some embodiments. Other materials can also be used.

The screen 46 can define various outer surfaces of the engine enclosure 40. In the current example, the screen 46 defines an upper surface 50, a front surface 52 (see FIG. 3B), and a back surface 54 of the engine enclosure 40. In some embodiments the screen can define additional surfaces of the engine enclosure 40, such as a first side surface 56 and a second side surface 58. In some embodiments the screen can define only the upper surface 50 and back surface 54 of the engine enclosure 40.

While the air intake area 41 is currently depicted as a single, unified opening (albeit covered with the screen 46), in some other embodiments the air intake area 41 can be defined by multiple openings in the outer enclosure assembly 45. In such embodiments a screen would be coupled to the outer enclosure assembly about each of the multiple opening that define a portion of the air intake area.

The inner enclosure surface 48 generally defines an airspace volume 49 between the inner enclosure surface 48 and the screen 46 of the engine enclosure 40. The airspace volume 49 is configured to receive ambient air from the air intake area 41. The inner enclosure surface 48 defines a first inner surface opening 60 and a second inner surface opening 62 to accommodate airflow there-through. The first inner surface opening 60 is a portion of a first airflow pathway 70 and the second inner surface opening 62 is a portion of a second airflow pathway 72. Each of the first airflow pathway 70 and the second airflow pathway 72 extend from the ambient environment external to the engine enclosure 40, through the screen 46 and into the airspace volume 49. In some embodiments, however, there can be multiple, discrete airspace volumes defined by the inner enclosure surface 48 and the screen 46. In such embodiments, the first airflow pathway 70 can extend through a first airspace volume and the second airflow pathway 72 can extend through a second airspace volume. In general, the first airflow pathway 70 and the second airflow pathway 72 are parallel flow paths. In some embodiments the first airflow pathway 70 and the second airflow pathway 72 are in fluid communication in the airspace volume 49.

In the current example, the engine enclosure 40 is formed by a hood 42 and a lower structure 44 (e.g., casting 44). The hood 42 has an outer hood surface 51 that defines a portion of the outer enclosure assembly 45. The outer hood surface 51 defines an outer hood opening 41 that is the air intake area 41. As such, the screen 46 is coupled to the outer hood surface 51 across the outer hood opening 41. In this example, the outer enclosure assembly 45 is defined by the outer hood surface 51, the screen 46, and the casting 44. The hood 42 also has an inner hood surface 48 that is the inner enclosure surface 48 of the engine enclosure 40.

The hood 42 can be removably coupled to the lower casting 44 such that an operator can access system components therein. In the current example a hinge 47 couples the hood 42 to the lower casting 44. An operator can pivot the hood 42 about the hinge 47 relative to the lower casting 44 to access the engine and other components contained within the engine enclosure 40. The engine enclosure 40 can have alternate configurations. In some embodiments the lower casting and the hood are a single cohesive component. In some embodiments the casting defines portions of the inner enclosure surface. In some embodiments the casting defines one or more openings that are a portion of the air intake area.

Vehicles consistent with embodiments of the present application can have a first engine cooling system 2 and a second engine cooling system 4 (see FIG. 4). The first engine cooling system 2 and the second engine cooling system 4 may operate in parallel. The first airflow pathway 70 can be part of the first engine cooling system 2 and the second airflow pathway 72 can be part of the second engine cooling system 4. The first engine cooling system 2 can be configured to air cool the engine and ancillary components. The second engine cooling system 4 can be configured to air cool engine oil.

The engine 80 is disposed within the engine enclosure 40. Particularly, the engine 80 is contained in an engine cavity 43 of the engine enclosure 40, which is defined between the inner enclosure surface 48 and the lower structure 44 (e.g., the casting) of the engine enclosure 40. The engine cavity 43 can be generally isolated from the airspace volume 49 within the engine enclosure 40. The first engine cooling system 2 has an engine shroud 90 having a main portion 91 that covers at least a portion of the engine 80. In various embodiments, the engine shroud 90 is configured to receive an engine head of the engine 80. The engine shroud 90 defines an engine cooling volume 92 around a portion of the engine 80. The engine shroud 90 can define the engine cooling volume 92 particularly around the engine head. The engine shroud 90 is generally configured to direct airflow in a generally downward direction to wash over and cool the engine and ancillary components. The engine shroud 90 can be constructed of a variety of materials and combinations of materials, but will generally be constructed of a substantially impermeable material to relatively increase airflow over the engine 80. In some embodiments the engine shroud 90 is constructed of metal or plastic.

The engine shroud 90 has a shroud intake 94 and a shroud outlet 93. The shroud outlet 93 is an opening defined by the engine shroud 90 in the engine cavity 43 of the engine enclosure 40. The shroud outlet 93 can be positioned vertically below the engine head 86. The shroud outlet 93 can be defined around a portion of the engine 80 in a variety of embodiments. The shroud outlet 93 defines a portion of the first airflow pathway 70 that is downstream of the main portion 91 of the engine shroud 90. From the shroud outlet 93, air in the first airflow pathway 70 can exit to the ambient environment through exhaust vent openings 74 defined in the outer enclosure between the engine cavity 43 and ambient environment (see FIGS. 3A, 3B, and 4). In some embodiments, air in the first airflow pathway 70 can exit to the ambient environment through exhaust vent opening(s) 74 in the lower structure 44 (e.g., the casting, particularly visible in FIG. 3B). In some embodiments, there are one or more exhaust vent openings 74 in a front portion of the lower structure 44 (see FIG. 3B). In some embodiments, air in the first airflow pathway 70 can exit to the ambient environment through exhaust vent openings 74 (visible in FIGS. 3A and 3B) defined by the engine enclosure 40. It is noted that a screen can be coupled to the engine enclosure 40 about one or more exhaust vent openings to prevent the ingress of debris to the engine cavity 43.

The shroud intake 94 of the shroud 90 is configured to receive air from the airspace volume 49 and direct the received air to the shroud. In the current example, the shroud 90 has a tubular projection 96 that defines the shroud intake 94. The tubular projection 96 extends between the engine cooling volume 92 and the airspace volume 49. The tubular projection 96 is disposed about the first inner surface opening 60 of the inner enclosure surface 48. In some embodiments, the shroud intake 94 may extend up to the airspace volume 49. The tubular projection 96 is configured to direct air from the airspace volume 49 into the engine cooling volume 92 of the shroud 90. The inner enclosure surface 48 can form a seal around the shroud intake 94. In particular, the inner enclosure surface 48 can form a seal with the engine shroud 90 about the shroud intake 94. In the current example, the inner enclosure surface 48 forms an axial seal with an annular surface 95 of the tubular projection 96 about the shroud intake 94. In some other embodiments the inner enclosure surface 48 can form a radial seal with the tubular projection 96 about the shroud intake 94. In the current example, the tubular projection 96 extends from the main portion 91 of the engine shroud 90 upwardly to the airspace volume 49.

The tubular projection 96 can be constructed of a variety of different materials and combinations of materials. In some embodiments, the tubular projection 96 is constructed of foam. In some embodiments the tubular projection 96 forms a unitary, cohesive structure with a main portion 91 of the shroud (i.e., the portion of the engine shroud 90 defining the engine cooling volume 236 that surrounds the engine 80). In some embodiments, the tubular projection 96 is a unitary, cohesive structure with the inner enclosure surface 48. In the current embodiment, however, the tubular projection 96 is a separate component from both the shroud 90 and the inner enclosure surface 48. Here the tubular projection 96 is coupled to a main portion 91 of the engine shroud 90 and the inner enclosure surface 48.

A first fan 82 is disposed in the first airflow pathway 70 to generate airflow along the first airflow pathway from the airspace volume 49 to the engine cooling volume 92. As such, the screen 46 and the airspace volume 49 are positioned upstream of the shroud intake 94 along the first airflow pathway 70. In the current example, the first fan 82 is disposed in or above the engine shroud 90. In examples, the first fan 82 can be an engine flywheel fan. The mass flow rate of air within the first airflow pathway 70 is generally regulated by the first fan 82. In some examples, the mass flow rate of the first fan 82 can range from 1,000 cubic feet/minute (ft$^3$/min) to 1,400 ft$^3$/min. In the current example, there is an engine stationary guard 87 and a rotating screen located next to a stationary chopping blade to reduce the debris size before it enters the engine cooling volume 92.

The tubular projection 96 defines a shroud intake area $A_{shroud}$. In various embodiments, the shroud intake area $A_{shroud}$ is less than the area of a first portion 41*a* of the air intake area 41 defining the first airflow pathway 70. The first portion 41*a* are the regions of the air intake area 41 where airflow tends to be directed to the shroud 90. As a result, the velocity of air passing through the shroud intake 94 is greater than the velocity of the air passing through the first portion 41*a* of the air intake area 41. In some examples, the ratio of the first portion 41*a* of the air intake area 41 to the shroud intake area $A_{shroud}$ is at least 10 to 1. The ratio of the first portion of the air intake area 41*a* to the shroud intake area $A_{shroud}$ can be at least 15 to 1, or 17 to 1.

The air intake area 41 can be sized to limit the velocity of ambient airflow therethrough, thereby limiting the amount of debris that would be carried to the screen 46 by the airflow. In an example, the air intake area 41 has an area of from about 700 square inches (in$^2$) to about 1300 in$^2$. In one particular example the air intake area 41 has an area from 800 in$^2$ to 1000 in$^2$. Other exemplary factors that can dictate the velocity of the air through a particular portion of the air intake area 41 can include the distance between the shroud intake 94 and the air intake area 41 and the configuration of the inner enclosure surface adjacent the air intake area 41.

Figure 5:
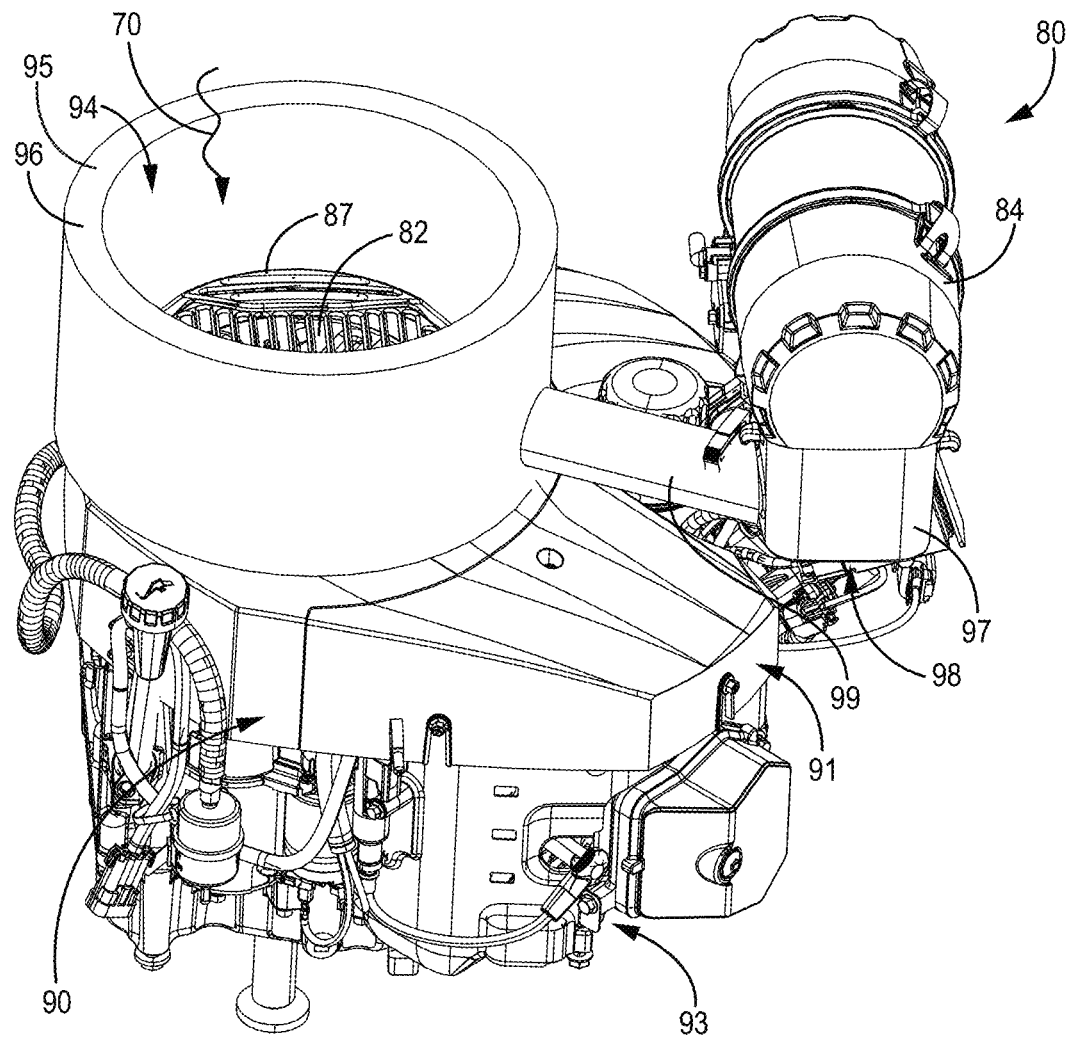
FIG. 5 depicts a first perspective view of an example engine cooling system consistent with FIG. 4.

In some embodiments, the engine 80 receives combustion air from the first airflow pathway 70. FIG. 5 depicts a perspective view of the engine 80 and engine shroud 90 consistent with various embodiments. The engine 80 has an air intake (e.g., air cleaner 84) that is generally configured to receive air. A combustion intake 98 directs air from the shroud intake 94 to the air cleaner 84. The combustion intake 98 has an air box 97 and a tube extension 99, where the tube extension 99 extends from the tubular projection 96 to the air box 97. The air box 97 is thus in fluid communication with the air cleaner 84 as well as the first airflow pathway 70. As a result of configurations consistent with the present example, the engine 80 is configured to receive air that has already passed through the screen 46 (see FIG. 4), thus minimizing the presence of entrained debris therein.

The first airflow pathway 70 discussed herein is generally defined by the first engine cooling system 2 of a vehicle. In various embodiments, the vehicle may also define a second engine cooling system 4 that operates in parallel to the first engine cooling system 2. Returning to FIGS. 3A and 4, an exemplary second engine cooling system 4 will now be described. The second engine cooling system 4 has a liquid-to-air heat exchanger 100. The heat exchanger 100 is generally configured to reduce the temperature of engine oil from the engine 80. In particular, the heat exchanger 100 receives engine oil from the engine 80 and ambient air is directed through the heat exchanger 100 to extract heat from the heat exchanger 100 and, therefore, the engine oil. Cooled oil is then returned to the engine.

The heat exchanger 100 is disposed in the engine enclosure 40, which in the illustrated embodiments, is thus operatively coupled to the vehicle frame 16 (see FIG. 2, for example). In particular, the heat exchanger 100 is coupled to the inner enclosure surface 48 about the second inner surface opening 62. The heat exchanger 100 can extend partially or completely across the second inner surface opening 62 and second airflow pathway 72. In some embodiments, the inner enclosure surface 48 forms a seal around the heat exchanger 100. As such, the second airflow pathway 72 extends from the ambient environment, through the screen 46, into the airspace volume 49, through the heat exchanger 100, and into the engine cavity 43 of the engine enclosure 40. The second airflow pathway 72 extends out to the ambient environment from the engine cavity 43 through the exhaust vent openings 74 (visible in FIGS. 3A, 3B, and 4) of the engine enclosure 40, which can include openings at the bottom of the engine enclosure. As such, the first airflow pathway 70 and the second airflow pathway 72 merge in the engine cavity 43. Both the first airflow pathway 70 and the second airflow pathway 72 extend through the engine cavity 43 and the exhaust vent openings 74 (FIGS. 3A, 3B, and 4).

A second fan 102 (visible in FIG. 4) is disposed in the engine enclosure 40. The second fan 102 is configured to generate airflow along the second airflow pathway 72 from the airspace volume 49 through the heat exchanger 100. The screen 46 and the airspace volume 49 are positioned upstream of the heat exchanger 100 along the second airflow pathway 72. The second fan 102 can be coupled to the heat exchanger 100 and across the second airflow pathway 72. The mass flow rate of air within the second airflow pathway 72 is generally regulated by the second fan 102.

The heat exchanger 100 defines an intake area $A_{exchanger}$. In various embodiments, the sum of the heat exchanger intake area $A_{exchanger}$ and the shroud intake area $A_{shroud}$ (discussed above) is less than the air intake area 41. As a general result of such a configuration, the velocity of air passing through the air intake area 41 is lower than the velocity of the air passing through the heat exchanger 100.

The heat exchanger intake area $A_{exchanger}$ is generally less than the area of a second portion 41*b* of the air intake area 41 defining the second airflow pathway 72. The second portion 41*b* is the region(s) of the air intake area 41 where airflow tends to be directed through the heat exchanger 100. As a result, the velocity of air passing through the heat exchanger 100 is greater than the velocity of the air passing through the second portion 41*b* of the air intake area 41. In some examples, the ratio of the second portion 41*b* of the air intake area 41 to the heat exchanger intake area $A_{exchanger}$ is at least 3 to 2. The ratio of the second portion 41*b* of the air intake area 41 to the heat exchanger intake area $A_{exchanger}$ can be at least 2 to 1 or 3 to 1

Figure 6:
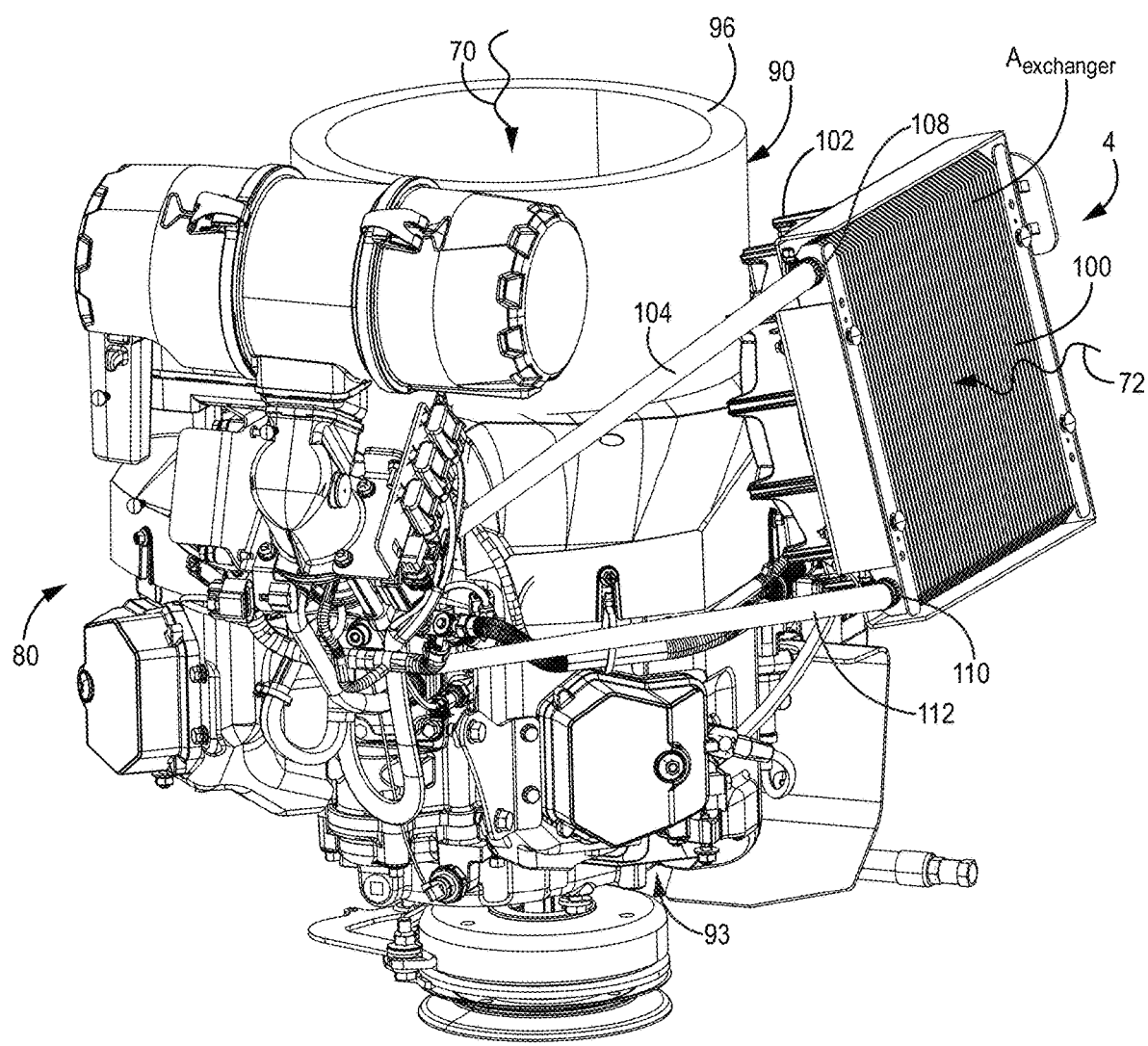
FIG. 6 depicts a second perspective view of example engine cooling systems consistent with FIG. 4.

FIG. 6 depicts a perspective view of the engine 80 and the second engine cooling system 4 consistent with various embodiments. An engine oil conduit 104 generally extends from the engine 80 to an oil inlet 108 of the heat exchanger 100. The heat exchanger 100 further defines an oil outlet 110. A return line 112 extends from the oil outlet 110 to the engine 80 and is configured to return cooled oil to the engine 80 from the heat exchanger 100.

A pump (not shown) is generally in fluid communication with the engine oil conduit 104 and the return line 112. The pump is configured to cycle the engine oil through the heat exchanger 100. In some embodiments, the engine 80 is a pressure lubricated engine, where the engine incorporates a lubricant pump that is configured to cycle engine oil through an oil flow pathway including an oil filter and engine components targeted for lubrication. In some such embodiments the heat exchanger 100, the engine oil conduit 104 and the return line 112 can be components along such an oil flow pathway. In such an example, a separate pump may advantageously be avoided because the lubricant pump can be used for the lubrication system and the second engine cooling system. In some other embodiments, a separate pump can be used to cycle engine oil through the heat exchanger 100.

Figure 7:
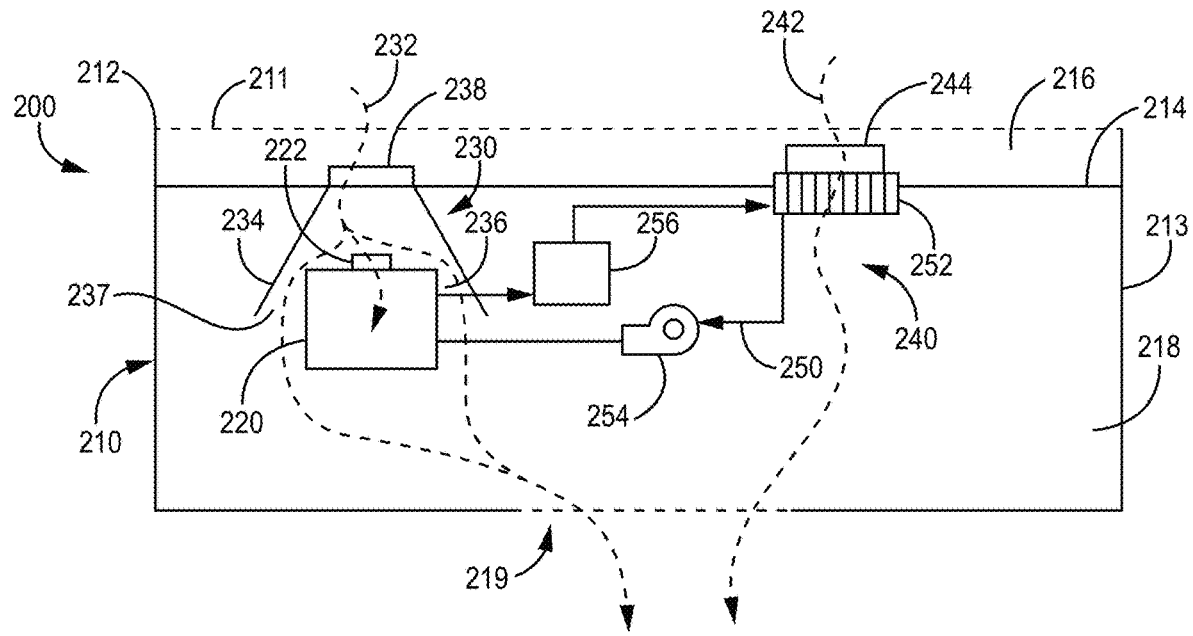
FIG. 7 depicts a schematic view of an example vehicle with parallel cooling systems consistent with embodiments.

While FIGS. 1-6 depict examples consistent with a particular example vehicle, other configurations are certainly possible. FIG. 7 depicts a schematic view of an example vehicle 200 with parallel cooling systems consistent with various embodiments. The example vehicle 200 can be consistent with an autonomous mower, as an example, or another type of vehicle. Components referenced herein can generally be consistent with the descriptions of similarly-named components described above with reference to FIGS. 1-6. The vehicle 200 has an engine enclosure 210, an engine 220 disposed in the engine enclosure 210, a first engine cooling system 230, and a second engine cooling system 240.

The engine enclosure 210 has an outer enclosure assembly 212 having a screened area defined by a screen 211 and an outer enclosure surface 213. The engine enclosure 210 has an inner enclosure surface 214. The screen 211 and the inner enclosure surface 214 define an airspace volume 216. The screen 211 defines an air intake area that leads to the airspace volume 216. The engine enclosure 210 and the inner enclosure surface 214 define an engine cavity 218 that receives the engine 220.

The first engine cooling system 230 is configured to air cool the engine 220. The first engine cooling system 230 has a shroud 234 that defines an engine cooling volume 236 about a portion of the engine 220. The first engine cooling system 230 defines a first airflow pathway 232 through the engine enclosure 210. The first airflow pathway 232 extends from the ambient environment through the screen 211, into the airspace volume 216 to the engine cooling volume 236 within the shroud 234. The first airflow pathway 232 extends from the shroud 234 through a shroud outlet 237 into the engine cavity 218 and out a vent opening(s) 219 and other openings defined by the engine enclosure 210. The vent opening(s) 219 can also be defined by a screen forming a portion of the outer enclosure assembly 212. A first fan 238 can be disposed across the first airflow pathway 232 to generate the airflow along the first airflow pathway 232. In the current example, the first fan 238 is depicted upstream of the shroud 234, but the first fan 238 can also be positioned elsewhere, such as within the shroud 234 as depicted in examples discussed above.

In a variety of embodiments, a combustion intake 222 is in fluid communication with the first airflow pathway 232 to receive air from the first airflow pathway 232. The combustion intake 222 extends to the engine 220 (such as an air cleaner of an engine) for combustion. In some embodiments the combustion intake 222 is coupled to the shroud 234, but in other embodiments the combustion intake 222 is not coupled to the shroud 234. The combustion intake 222 can extend into the first airflow pathway 232. In various examples, including the one currently depicted, the combustion intake 222 is in fluid communication the first engine cooling system 230. In other embodiments the combustion intake 222 is not in fluid communication with the first engine cooling system 230.

The second engine cooling system 240 is configured to cool engine oil. The second engine cooling system 240 defines an oil flow pathway 250 and a second airflow pathway 242. The second engine cooling system 240 has a heat exchanger 252 disposed in the engine enclosure 210, where the heat exchanger 252 is a component along the oil flow pathway 250 and is configured to receive engine oil. The second airflow pathway 242 extends from the ambient environment through the screen 211, into the airspace volume 216 to the heat exchanger 252. The second airflow pathway 242 extends through the heat exchanger 252 into the engine cavity 218 and out the vent opening(s) 219 defined by the engine enclosure 210. A second fan 244 can be disposed across the second airflow pathway 242 to generate the airflow along the second airflow pathway 242. Here the second fan 244 is depicted upstream of the heat exchanger 252, but the second fan can also be positioned downstream of the heat exchanger, as depicted in examples discussed above.

In various embodiments, the second engine cooling system 240 has a pump 254 disposed along the oil flow pathway 250 that is configured to cycle engine oil between the heat exchanger 252 and the engine 220. As discussed above, the pump 254 can be a component of the engine 220, or the pump 254 may be separate from the engine 220. In various embodiments, a filter 256 may be in fluid communication with the oil flow pathway 250 to filter the engine oil. In some other embodiments, a filter is not along the oil flow pathway 250.

It is noted that, in the example of FIG. 7, the airspace volume 216 is a single airspace volume common to both the first airflow pathway 232 and the second airflow pathway 242. As such, the first airflow pathway 232 and the second airflow pathway 242 are connected at the airspace volume 216. However, the first airflow pathway 232 and the second airflow pathway 242 diverge downstream of the airspace volume 216. The first airflow pathway 232 and the second airflow pathway 242 merge in the engine cavity 218 and through the vent opening(s) 219.

Figure 8:
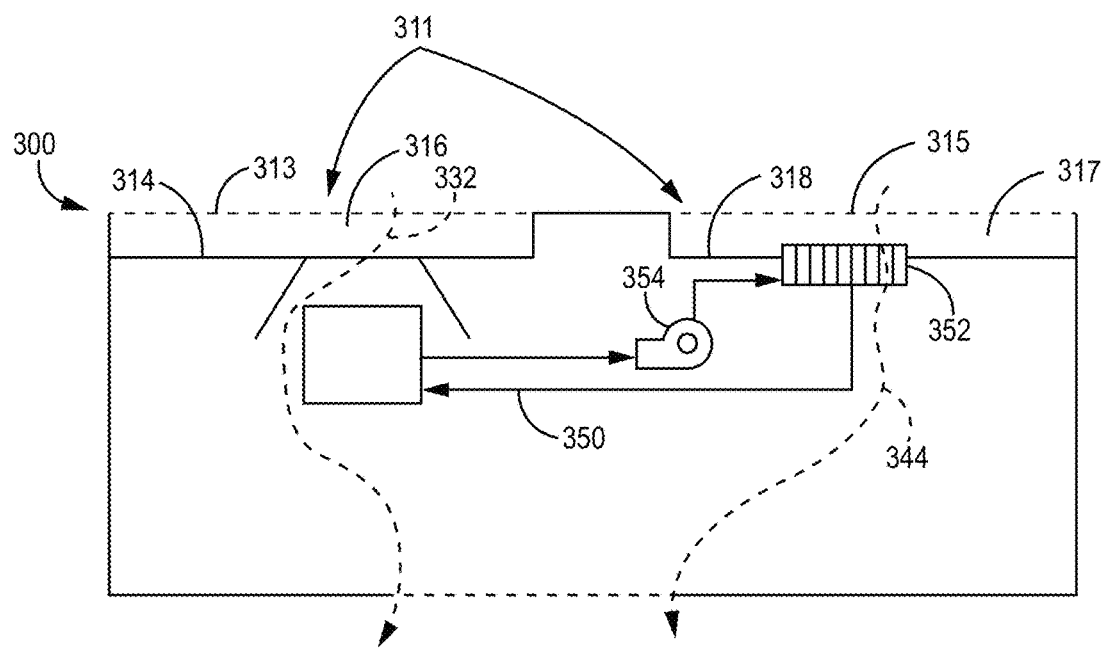
FIG. 8 depicts a schematic view of another example vehicle with parallel cooling systems consistent with embodiments.

FIG. 8 is another schematic of an example vehicle 300 showing some variations of the example of FIG. 7. The example vehicle 300 can be consistent with an autonomous mower, as an example, or another type of vehicle. In the current schematic, a screened area 311 defines an air intake area (also denoted by 311). In particular the screened area 311 has two discrete screens: a first screen 313 and a second screen 315. The first screen 313 defines a first air intake area (also denoted by 313). The second screen 315 defines a second air intake area (also denoted by 315). The first screen 313 and a first inner enclosure surface 314 define a first airspace volume 316. The second screen 315 and a second inner enclosure surface 318 define a second airspace volume 317 discrete from the first airspace volume 316. As such, a first airflow pathway 332 extends from the first airspace volume 316 and a second airflow pathway 344 extends from the second airspace volume 317. The first airspace volume 316 and the second airspace volume 317 can cumulatively be referred to as the airspace volume of the example vehicle, however. Similarly, the first intake area 313 and the second air intake area 315 may cumulatively be referred to as the air intake area of the vehicle 300. It is also noted that, in the current example, an oil flow pathway 350 extends from the engine 320 and has a heat exchanger 352 and a pump 354, but lacks a filter, such as that described above with reference to FIG. 7.

This application is intended to cover adaptations or variations of the present subject matter. It is to be understood that the above description is intended to be illustrative, and not restrictive, and the claims are not limited to the illustrative embodiments as set forth herein.

What is claimed is:

1. A grounds maintenance vehicle comprising:
an engine enclosure defining an air intake area, wherein a screen extends across the air intake area, and the engine enclosure comprising at least one inner enclosure surface defining at least one airspace volume between the air intake area and the inner enclosure surface;
an engine disposed in the engine enclosure;
an engine shroud defining an engine cooling volume about a portion of the engine; and
a heat exchanger disposed in the engine enclosure, the heat exchanger configured to receive engine oil, wherein the vehicle defines a first airflow pathway extending from the air intake area to the engine shroud, and a second airflow pathway extending from the air intake area through the heat exchanger, wherein the first airflow pathway and the second airflow pathway are arranged in parallel.

2. The grounds maintenance vehicle of claim 1, further comprising a first fan disposed across the first airflow pathway and a second fan disposed across the second airflow pathway.

3. The grounds maintenance vehicle of claim 1, wherein the at least one airspace volume is a single airspace volume.

4. The grounds maintenance vehicle of claim 1, wherein the at least one airspace volume comprises a first airspace volume and a second airspace volume discrete from the first airspace volume, and the first airflow pathway extends through the first airspace volume and the second airflow pathway extends through the second airspace volume.

5. The grounds maintenance vehicle of claim 1, wherein the engine shroud defines a shroud intake that extends to an airspace volume of the at least one airspace volume.

6. The grounds maintenance vehicle of claim 1, further comprising a combustion intake extending from the engine shroud to an air cleaner.

7. The grounds maintenance vehicle of claim 1, wherein the inner enclosure surface forms a seal around each of the heat exchanger and the engine shroud.

8. The grounds maintenance vehicle of claim 1, wherein the screen defines an upper surface, a back surface and a front surface of the engine enclosure.

9. The grounds maintenance vehicle of claim 1, wherein the engine enclosure defines an engine cavity isolated from the at least one airspace volume, and the engine is disposed in the engine cavity.

10. A grounds maintenance vehicle comprising:
an engine;
an engine shroud defining a shroud intake and an engine cooling volume around the engine;
an engine oil conduit extending from the engine; and
a heat exchanger coupled to the engine oil conduit, wherein the vehicle defines a first airflow pathway extending through the engine shroud and the engine cooling volume, and a second airflow pathway extending through the heat exchanger, wherein the first airflow pathway and the second airflow pathway are arranged in parallel.

11. The grounds maintenance vehicle of claim 10, further comprising an engine enclosure containing the engine, the engine enclosure defining an air intake area, wherein at least one screen extends across the air intake area and wherein the air intake area is upstream of the shroud intake and the heat exchanger.

12. The grounds maintenance vehicle of claim 11, wherein the screen defines an upper surface, a back surface and a front surface of the engine enclosure.

13. The grounds maintenance vehicle of claim 11, wherein the engine enclosure further comprises at least one inner enclosure surface, wherein an airspace volume is defined between the screen and each inner enclosure surface, and wherein an airspace volume is upstream of each of the shroud intake and the heat exchanger.

14. The grounds maintenance vehicle of claim 13, wherein the shroud intake extends to the airspace volume.

15. The grounds maintenance vehicle of claim 13, wherein the inner enclosure surface defines a first inner surface opening and the shroud intake extends across the opening.

16. The grounds maintenance vehicle of claim 13, wherein the inner enclosure surface defines a second inner surface opening and the heat exchanger extends across the opening.

17. The grounds maintenance vehicle of claim 10, further comprising a combustion intake extending from the engine shroud to an air cleaner.

18. The grounds maintenance vehicle of claim 10, further comprising a first fan configured to direct airflow into the engine shroud.

19. The grounds maintenance vehicle of claim 10, further comprising a fan configured to direct airflow into the heat exchanger.

20. A grounds maintenance vehicle comprising:
a vehicle frame;
drive wheels coupled to the vehicle frame;
an implement coupled to the vehicle frame;
an engine enclosure coupled to the vehicle frame, wherein the engine enclosure defines an engine cavity and an airspace volume isolated from the engine cavity within the engine enclosure, and where the engine enclosure comprises a screened area between the airspace volume and an ambient environment;
an engine disposed in the engine cavity of the engine enclosure;
a first engine cooling system comprising an engine shroud defining an engine cooling volume about a portion of the engine, wherein the first engine cooling system defines a first airflow pathway extending from the screened area to the engine cavity via the engine cooling volume;
a second engine cooling system comprising a heat exchanger, an oil flow pathway from the engine to the heat exchanger, and a second airflow pathway extending from the screened area to the engine cavity through the heat exchanger, wherein the first engine cooling system and the second engine cooling system operate in parallel; and
a combustion intake extending from the shroud into the engine.

21. The grounds maintenance vehicle of claim 20, wherein the implement comprises a cutting deck.

* * * * *